US006866587B1

(12) United States Patent
Lane

(10) Patent No.: US 6,866,587 B1
(45) Date of Patent: Mar. 15, 2005

(54) WIDE AREA REAL-TIME SOFTWARE ENVIRONMENT

(75) Inventor: Greg Lane, New Farm (AU)

(73) Assignee: Auran Holdings Pty Ltd., Queensland (AU)

( * ) Notice: Subject to any disclaimer, the term of this patent is extended or adjusted under 35 U.S.C. 154(b) by 264 days.

(21) Appl. No.: 09/669,479

(22) Filed: Sep. 25, 2000

(51) Int. Cl.[7] .......................... A63F 13/00; A63F 9/24; G06F 17/00; G06F 19/00; G06F 155/00

(52) U.S. Cl. .............................. 463/43; 463/1; 463/40; 463/42; 700/90; 700/91

(58) Field of Search .............................. 463/1, 29, 30, 463/40–43, 46, 47; 700/90–92, 80; 348/14.1, 552

(56) References Cited

U.S. PATENT DOCUMENTS

| 5,155,847 A | | 10/1992 | Kirouac et al. ............. 395/600 |
| 5,166,886 A | * | 11/1992 | Molnar et al. .............. 700/234 |
| 5,497,479 A | | 3/1996 | Hornbuckle ................ 395/491 |

(List continued on next page.)

OTHER PUBLICATIONS

Bill Husted, Atlanta Journal, "Free Downloads Let Gamers Try Before They Buy: [North Sports Final Edition]," Chicago Tribune, Chicago, Ill.: Jan. 4, 1999, p. 7.
Jaffa Software, "WimpWorks v2," Current Version: 2.20) (Sep. 3, 1998), http://thor.prohosting.com/~jsoft/product/wimpworks.html.

*Primary Examiner*—A. L. Wellington
*Assistant Examiner*—Binh-An D Nguyen
(74) *Attorney, Agent, or Firm*—Kenyon & Kenyon

(57) ABSTRACT

A system for the remote monitoring or modification, whether temporary or permanent, of a running application's attributes. These attributes include, for example, art, sound, music, text, environmental variables or artificial intelligence parameters, program source code, program pseudo code, program compiled code or any other computerized attributes. The application is enabled so that there is the ability to dynamically monitor an application's internal data, components and functionality via a remote station and/or dynamically save application usage data while that application is executing. Further, this program has the ability to temporarily or permanently change internal settings and attributes of the application and add extra functionality to the application. If charges or added functionality are permanent, they can be used when the application is executed.

21 Claims, 9 Drawing Sheets

U.S. PATENT DOCUMENTS

| | | | |
|---|---|---|---|
| 5,695,400 A | 12/1997 | Fennell, Jr. et al. | 463/42 |
| 5,708,709 A | 1/1998 | Rose | 380/4 |
| 5,890,963 A | 4/1999 | Yen | 463/42 |
| 5,907,617 A | 5/1999 | Ronning | 380/4 |
| 5,920,725 A | 7/1999 | Ma et al. | 395/712 |
| 5,930,765 A | 7/1999 | Martin | 705/14 |
| 5,984,508 A | 11/1999 | Hurley | 364/479.07 |
| 5,984,786 A | 11/1999 | Ehrman | 463/42 |
| 5,999,740 A | 12/1999 | Rowley | 395/712 |
| 6,009,274 A | 12/1999 | Fletcher et al. | 395/712 |
| 6,049,671 A | 4/2000 | Slivka et al. | 395/712 |
| 6,074,434 A | 6/2000 | Cole et al. | 717/11 |
| 6,113,495 A | 9/2000 | Walker et al. | 463/42 |
| 6,126,546 A * | 10/2000 | Reed et al. | 463/40 |
| 6,179,713 B1 | 1/2001 | James et al. | 463/42 |
| 6,200,216 B1 | 3/2001 | Peppel | 463/1 |
| 6,219,836 B1 | 4/2001 | Wells et al. | 717/11 |
| 6,237,092 B1 | 5/2001 | Hayes, Jr. | 713/100 |
| 6,243,692 B1 | 6/2001 | Floyd et al. | 705/59 |
| 6,264,561 B1 * | 7/2001 | Saffari et al. | 463/42 |
| 6,334,214 B1 | 12/2001 | Horstmann | 717/11 |
| 6,352,479 B1 | 3/2002 | Sparks, II | 463/42 |
| 6,356,543 B2 | 3/2002 | Hall et al. | 370/352 |
| 6,367,077 B1 | 4/2002 | Brodersen et al. | 717/170 |
| 6,379,251 B1 | 4/2002 | Auxier et al. | 463/42 |
| 6,402,618 B1 * | 6/2002 | Reed et al. | 463/40 |
| 6,467,088 B1 | 10/2002 | alSafadi et al. | 717/173 |
| 6,488,585 B1 | 12/2002 | Wells et al. | 463/43 |
| 6,493,871 B1 | 12/2002 | McGuire et al. | 717/173 |
| 6,496,979 B1 | 12/2002 | Chen et al. | 717/178 |
| 6,507,833 B1 | 1/2003 | Hichwa et al. | 707/1 |
| 6,513,111 B2 | 1/2003 | Klimczak et al. | 713/1 |
| 6,536,039 B2 | 3/2003 | Sanford | 717/173 |
| 6,554,707 B1 | 4/2003 | Sinclair et al. | 463/39 |
| 2001/0003714 A1 | 6/2001 | Takata et al. | 463/40 |
| 2002/0129349 A1 | 9/2002 | Ebisawa | 717/172 |

\* cited by examiner

WIDE AREA REAL-TIME SOFTWARE ENVIRONMENT

FIELD OF INVENTION

The present invention is directed to a computerised system to dynamically and remotely monitor a computer program's internal data objects, and more particularly, to a system that allows an external entity to dynamically and remotely change the internal attributes of the computer program.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

It is often necessary to update computer programs. However, existing methods of updating a program often require user interaction. For example, a user can choose to update a program by downloading a file across the Internet from a remote server, and install that file. Often, to install the update, the program that is being updated must be closed during the update process, or restarted at the end of the update process.

It would be beneficial to have a computer system that dynamically updates a computer program while it is running, without having to shut down the computer program that is being updated.

Moreover, after a program is released, the developers of the program have difficulties in determining what parts of the program should or must be changed. Developers rely on messages (often cryptic) from users that explain problems or express wishes for additional features. In some instances, the users simply stop using a program that does not operate correctly or that does not have the features or sophistication required by the user.

Developers express the need for a system to allow the developer to remotely monitor the operation of a computer program, and where desirable, change, update or enhance the operation of the computer program while it is being used.

For example, consider a user playing a computer game. It would be desirable if the creator of the computer game could remotely monitor a number of users playing the game. The creator would like to determine which features the users like and use often, and which features the users do not use. The creator would like to see what parts of the game the users find too easy or too hard. Based on this, it would be useful if the creator could change the operation of the game as it is being played by users, for example, by changing game logic or artificial intelligence, changing game parameters, adding new worlds or characters, changing lighting or sound effects, and the like. Users would then find the game more exciting, dynamic and challenging.

SUMMARY OF THE INVENTION

The present invention is directed to a computer-implemented system to allow a person or computer program to monitor and change the operation of a second computer program running on a remote computer, as the second computer program is being executed.

In summary, the present invention relates to the remote monitoring or modification, whether temporary or permanent, of a running application's attributes (for example, art, sound, music, text, environmental variables or artificial intelligence parameters, program source code, program pseudo code, program compiled code or any other computerized attributes.)

The representative embodiment of the present invention is a computer-controlled system dubbed a "Wide Area Virtual Environment" ("WAVE"). The name stems from the invention's ability to allow real-time or offline monitoring and real-time modification of WAVE compatible applications. An application program is compatible if its systems have, include or have access to the appropriate WAVE interface.

When used with a compatible system, WAVE allows an application designer, technician or programmer to virtually be "inside" the computer on which the application is running. Further, WAVE allows application usage data to be stored and uploaded for analysis at a later date.

Due to WAVE's configuration, the standard "client-server" terminology is somewhat reversed. A WAVE server describes the system where the application being monitored is executing. The WAVE server, for example, may be executing a computer game (which is the WAVE compatible application). The WAVE client describes the system that receives the monitoring data and from which requests and commands are issued by the observer. Although the changes submitted by the observer are made on the WAVE client (the monitoring system), they take effect, in real time, on the WAVE server (the application system).

WAVE is a powerful system allowing real-time remote control over WAVE compatible applications. To facilitate this control, WAVE uses a standard computer network, to establish appropriate communications between the WAVE client and server. This network can be, for example, a LAN, WAN or the Internet. The WAVE client acts as a remote, real-time editing console for WAVE compatible systems and applications. The WAVE server acts as the gateway between the WAVE client (and ultimately the observer) and the internal attributes, settings and configuration of the systems. The WAVE server also allows application usage data to be saved locally and uploaded for analysis at a later time.

Using its real-time functionality, WAVE enables enhanced monitoring and modification that is invaluable to application developers and systems technicians. For instance, computer game developers and technicians can use WAVE to access remote computers and quickly pinpoint problems. They can then make appropriate changes within the engine or even upload new code to solve the problem.

WAVE is extremely useful to application developers; particularly computer game designers. Game designers can monitor game testing and dynamically change the way a game is played. For instance, a game designer can adjust resource values to find and appropriately balance the game play. Through WAVE, a game designer has a way of interacting with the play testers as they play the game rather than having to wait for their feedback afterwards. WAVE greatly improves production time of WAVE compatible computer games.

WAVE's offline functionality allows application developers to store, and later upload, application usage data about their products. As an application is used, data collected by WAVE can be saved to local storage. This data can then be upload to a statistics server at a later date. The statistics server can use the data gathered from numerous systems to analyze application usage and assist in further enhancements and improvements to current and future products.

In short, the present invention, called herein WAVE, relates to any computer program and has the ability to dynamically monitor an application's internal data, components and functionality via a remote station and/or dynamically save application usage data while that application is executing. Further, this program has the ability to temporarily or permanently change internal settings and attributes of the application and add extra functionality to the application. If changes or added functionality are permanent, they can be used when the application is subsequently executed.

DETAILED DESCRIPTION

Appropriate Hardware Configuration

Figure 1:
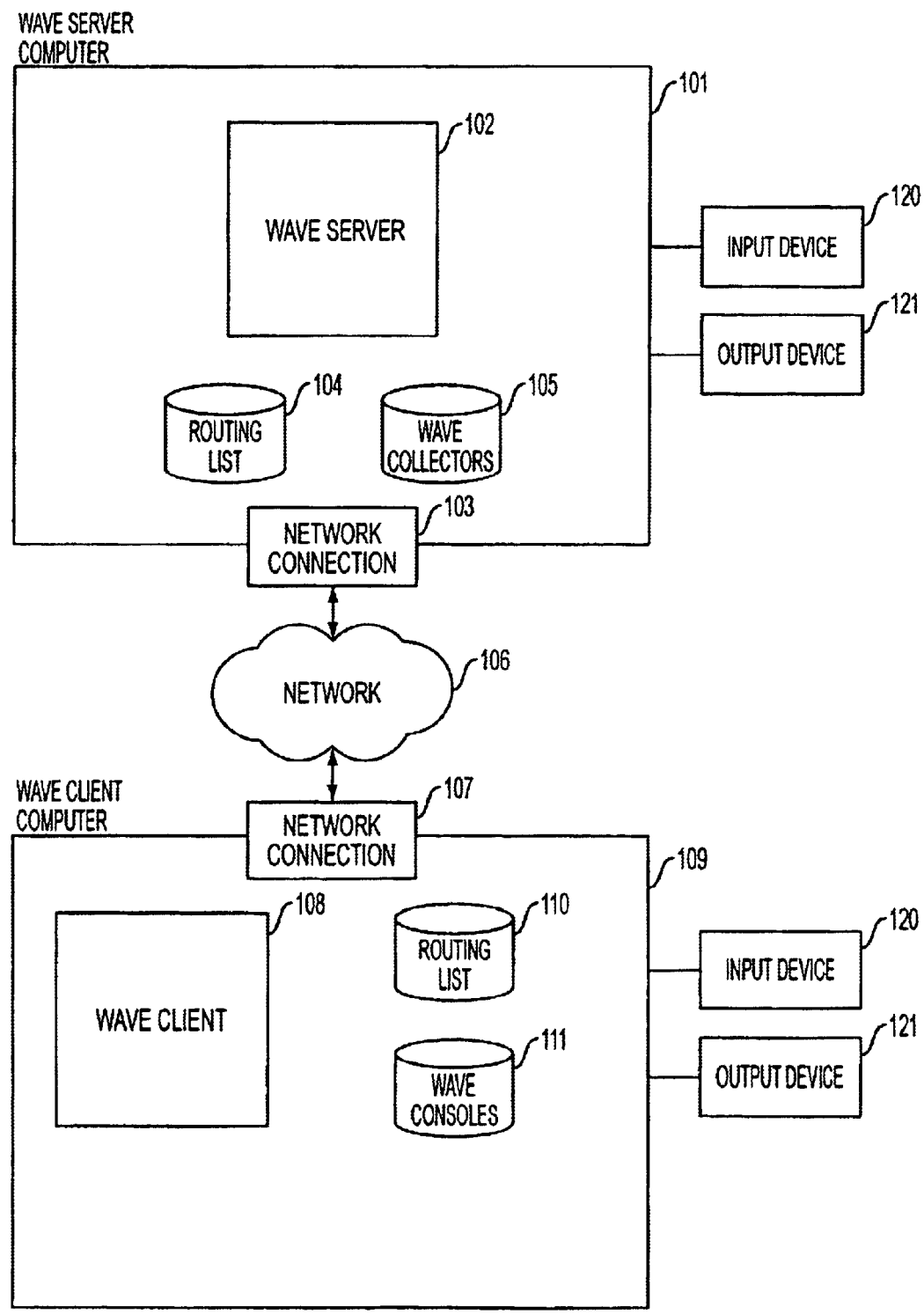
FIG. 1 is a high level block diagram illustrating the representative hardware and software components of a representative embodiment of the present invention

Referring now to the drawings, and initially FIG. 1, there is illustrated in block diagram form the representative hardware and software elements and configuration of the WAVE system according to a representative embodiment of the present invention.

The representative embodiment of the present invention uses a client-server model to facilitate communications between a user's computer (the server) 101 and the WAVE client computer (the client server) 109. Client-server architecture is well known in the art and is suited to the functions of the present invention, for example, filling client requests for program objects. An overview of an appropriate hardware configuration for both the client and server is described. Using this configuration, the representative embodiment of the invention can be employed.

The user's computer 101 runs the WAVE server 102 and controls input devices 120 and output devices 121.

Due to the nature of the software of the present invention, the underlying hardware is not vital for the purposes of the invention. The server 101 can be constructed using any hardware so long as:

the server 101 is a computer;

the underlying hardware can execute the WAVE server software 102; and

Be able to establish a reliable network connection 106 with the client using some type of network gateway 103 or other network connection.

Preferably, the connection to the network 106 is a permanent connection. If not, the connection ideally should be maintained while the invention is in operation.

The client computer 109 most commonly consists of a personal computer. Similar to the server, the exact selection of hardware is not vital, and indeed the WAVE client 108 and WAVE server 102 are written to take advantage of new hardware platforms (such as handheld devices) as they become available. For the purposes of the representative embodiment, the client computer 109 is a PC with an network connection (through, for example, a modem, Ethernet network or wireless connection) 107. The network connection 107 allows the client computer 109 to be coupled to a network 106. The client computer 109 is capable of executing the WAVE client software.

The client computer 109 and server computer 101 both comprise a processor (not shown), such as an Intel Pentium or AMD Athlon processor, RAM (not shown) and a hard disk drive (not shown) and CDROM drive (not shown).

Although the processor can be any computer processing device, the representative embodiment of the present invention will be described herein assuming that the processor is an Intel Pentium processor or higher. The hard disk of the client computer 109 and server computer 101 store an operating system, such as the Microsoft Windows 98, Windows NT or Windows 2000 operating system, which is executed by the processor. The present invention is not limited to the Windows operating system, and with suitable adaptation, can be used with other operating systems. For ease of explanation, the representative embodiment as described herein assumes the Windows 98 operating system.

Application program computer code, such as the WAVE client 108 and WAVE server 102, is stored on a disk that can be read and executed by the processor. In the representative embodiment, the WAVE server will query and gather data from a suitable computer program (not shown) installed on the user's computer 101.

Coupled to the client computer 109 and server computer 101 are one or more input devices 120, such as a keyboard, mouse, joystick, trackball, microphone, scanner, and the like. Also coupled to the client computer 109 and server computer 101 are one or more output devices 121, such as a monitor, sound speakers, printer, and the like.

Appropriate Software Configuration

In the preferred embodiment, the WAVE client 108 refers to the system used to monitor and modify compatible systems. The WAVE server 102 facilitates this monitoring and modification through the use of appropriate WAVE interfaces. For instance, the WAVE server 102 allows data to be collected and commands to be issued to the compatible applications and their sub-systems. The server 102 also facilitates the storing of application statistics which can be uploaded to a central server (e.g. 109) at a later date. The client and server configurations are described below. The section entitled Procedures describes in further detail the processes of the WAVE software.

Server Software Configuration

A WAVE server is most often executed or called by a WAVE compatible application. The WAVE server is comprised of the following components:

WAVE server software 102;

a routing list 104; and a number of WAVE Collectors 105.

The server software 102 is described in detail in the section entitled WAVE server below. The routing list 104 and the WAVE Collectors 105 are described below.

The server routing list 104 is an inventory of the data requested from the server's Collectors 105. As the name suggests, the routing list 104 is used by the WAVE server 102 to route data from a Collector 105 to the appropriate client. The data ultimately arrives at the WAVE Console 111 (see below) that requested the data.

The routing list 104 contains a number of elements for each data request. Each request in the list includes:

The unique identifier (UID) of the WAVE Console 111 requesting the data;

The client's 109 network address;

The globally unique identifier (GUID) of the Collector 105 the data was requested from;

The type of data requested; and

A flag signifying if the request was for periodic data.

When a Collector 105 provides data to the WAVE server 102, the server uses these elements to determine the data's destination. The server 102 examines the routing list 104 and determines which clients have requested the data. The server then packages the data, along with the UID of the requesting Console 111 and the globally unique identifier (GUID) of the Collector 105, and sends the package to the specified network address.

After sending the package, the server checks the periodic data flag. If the flag is set, the client 109 has requested periodic data from the Collector 105. The request therefore stays in the list. When a client 109 requests one-time data, the periodic data flag is not set. Such a case arises where the client 109 has issued a command rather than requested data. Where the flag is not set, the request is removed from the routing list after the Collector's data is delivered.

At the center of the WAVE system lie the WAVE Collectors 105. The Collectors 105 gather data from and submit commands to WAVE compatible programs and systems (not shown). For example, a computer game's software could have customized Collectors that could gather internal data and accept commands to change internal settings. The 3D system for instance, could have a WAVECollector3D Collector that would facilitate querying of the 3D system for data and changing of internal 3D system attributes. Collectors 105 also facilitate offline collection of application usage data. Collectors 105 can either send the collected data to the WAVE client 108 or save that data to a file. The data is collected using two possible queries; system based collection or instance based collection.

To gather general system information, WAVE Collectors 105 use a standard WAVE interface. All WAVE compatible systems have this interface to facilitate system based collection. Other application systems can be queried using system based collection but are more likely to implement instance based collection (see below). When a Collector 105 queries a system that has the WAVE interface, the system provides a list of available data. The Collector can then check if the data being requested is available from that system. For instance, if a Collector queries a 3D system, it may list attributes such as the frame rate, texture memory and current video driver. The Collector can then check that list and request the appropriate attribute from the 3D system and pass that data to the WAVE server 102.

For systems that do not have the WAVE interface or where individual objects need to be communicated with, instance based collection is implemented. For instance based collection, an application or system specific WAVE Collector 105 is used to query the application or system for individual program object addresses. To facilitate this, each object is registered with the WAVE server The Collector 105 can then find each program object's address. After obtaining a program object's address, the WAVE Collector 105 can query the specific object based on the WAVE client's 108 request. For instance, if an observer wants the orientation of a 3D object in an application, the WAVE Collector 105 cannot simply query the 3D system. The 3D system only provides information about system level 3D operations such as the memory usage, frame rate and other attributes global to all 3D objects. To gather data about a specific object, the object itself must be queried. If the object has been registered with WAVE Server 102, the Collector 105 can find the object's address and query it for its orientation data. The Collector 105 has, therefore, queried an object directly and can provide the client with data on that particular 3D object rather than the 3D system in general.

After obtaining the data, the Collector 105 can supply the data to the WAVE server 102 or save the data locally. In the latter case, the Collector's 105 data can be saved to a file and uploaded to a statistics server (not shown) at a later date. Data such as the frequency of button use, the video driver used and the amount of time spent using the application can 111 be saved. This data can then be interpreted by developers to assist in enhancing product development.

Client Software Configuration

WAVE client software 108 can be run by many host applications (not shown). If the WAVE protocol is known, a standalone WAVE client 108 can be built to communicate with a WAVE server 102.

The WAVE client consists of a number of components:

the WAVE client software 108;

a routing list 110; and a number of WAVE Consoles 111.

The main component of the WAVE client, the client software 108, is described in detail in WAVE client (see below). The client routing list 110 and the WAVE Consoles 111 are described below.

The client routing list 110 is similar to the server routing list 104 (see above). The list contains data requests made by each Console 111. The WAVE client 108 uses the routing list 110 to route incoming data from the WAVE server 102, to the appropriate Console 111.

The WAVE client's 108 routing list 110 contains a number of elements for each data request. Each request in the list includes:

The GUID of the Collector 105 gathering the data;

The server's 101 network address; and

The UID of the Console 111 requesting the data.

When data arrives from a WAVE server 102, the WAVE client 108 routes the data using the above elements. Using the routing list, the client 108 determines which Console 111 is expecting the data. The client extracts the UID of the Console 111, the GUID of the Collector 105 and the server's 101 network address from the received data package. The client 108 then sends the data from the package to the appropriate Console 111.

A WAVE Console 111 is the final interface between the WAVE system and the observer. The Console 111 displays incoming data in a meaningful way and allows the observer to issue commands to the server. There are two types of Console 111 currently implemented in WAVE; system specific and system generic.

Consoles 111 are normally written to obtain and display data from and submit commands to a particular system or application. They are therefore paired with a Collector 105 and are used to display the Collector's 105 data to the observer. When a developer creates a Collector 105, they can create a Console 111 that allows the observer to best view and change their system's attributes and settings.

Customized Consoles 111 allow a detailed, well organized display of data from a specific Collector 105. An observer however, may want to monitor a number of different pieces of data. WAVE allows an observer to create their own Consoles 111 by providing a number of generic tools that can request WAVE data and submit WAVE commands. For example, an observer may want to monitor the current frame rate, the number of currently outputted sounds and the sound cache. The observer creates a new generic Console 111 and selects a bar graph, a digital gauge and a slide-bar. A list of attributes is then obtained from a WAVE server 102 on the network. The observer selects the frame rate of the server and maps that attribute to the bar graph. The number of sounds is then mapped to the digital gauge. Finally the sound cache is mapped to the slide-bar where the level can be easily adjusted. By using WAVE's customizable Console 111, the observer can now monitor three distinct attributes without having to create a Collector-Console pair.

Procedures

The following procedural outline details the preferred embodiment of WAVE. In this embodiment, a guaranteed network communication protocol is assumed. As such, there is no error checking or recovery detailed. It would be clear to those of the art that when implementing WAVE, such error checking and recovery would be required in the program code to insure proper functionality.

Client Operation

Figure 2A:
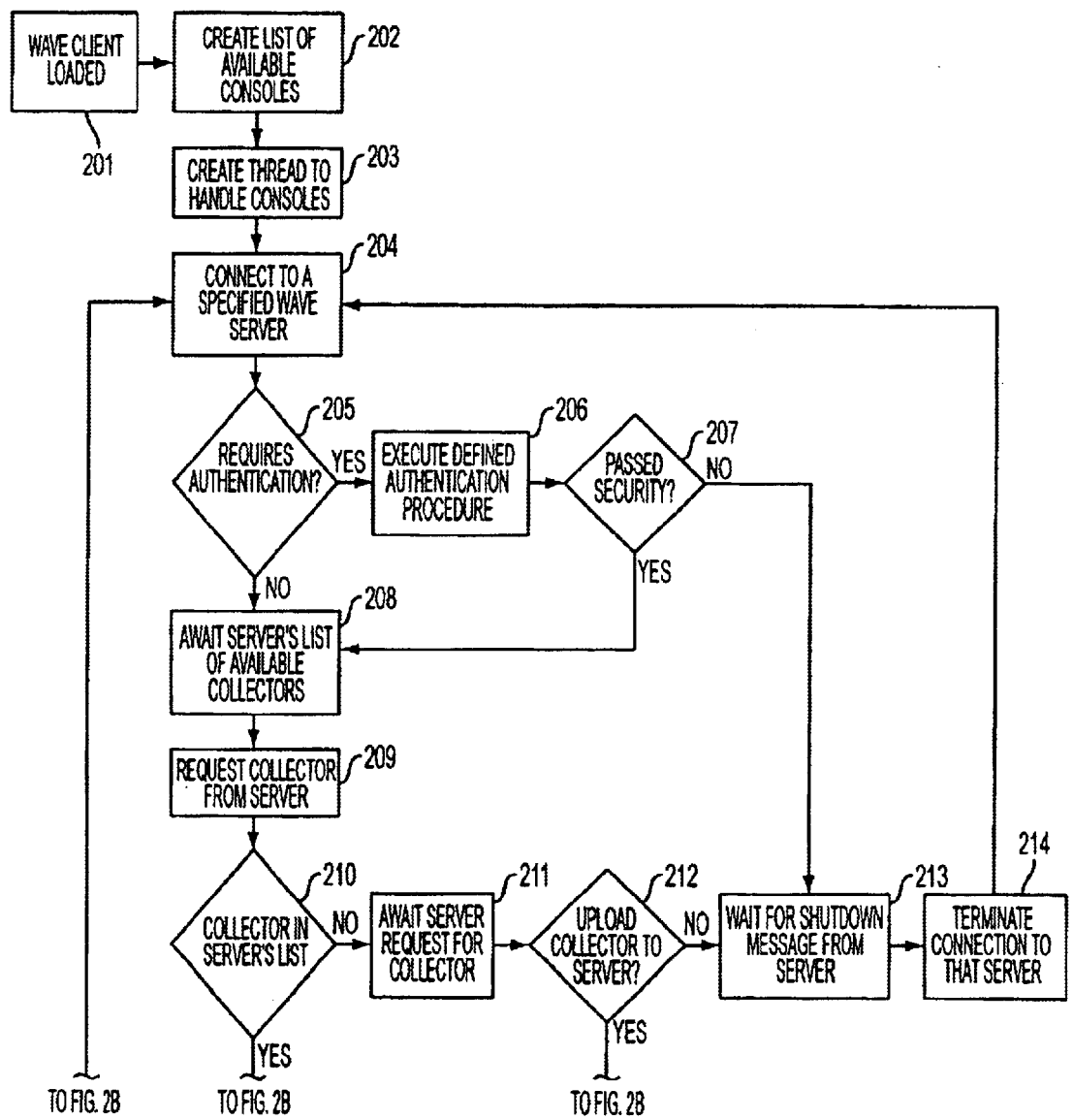
FIGS. 2A and 2B are flow charts of the steps of the client-side operations.
Figure 2B:
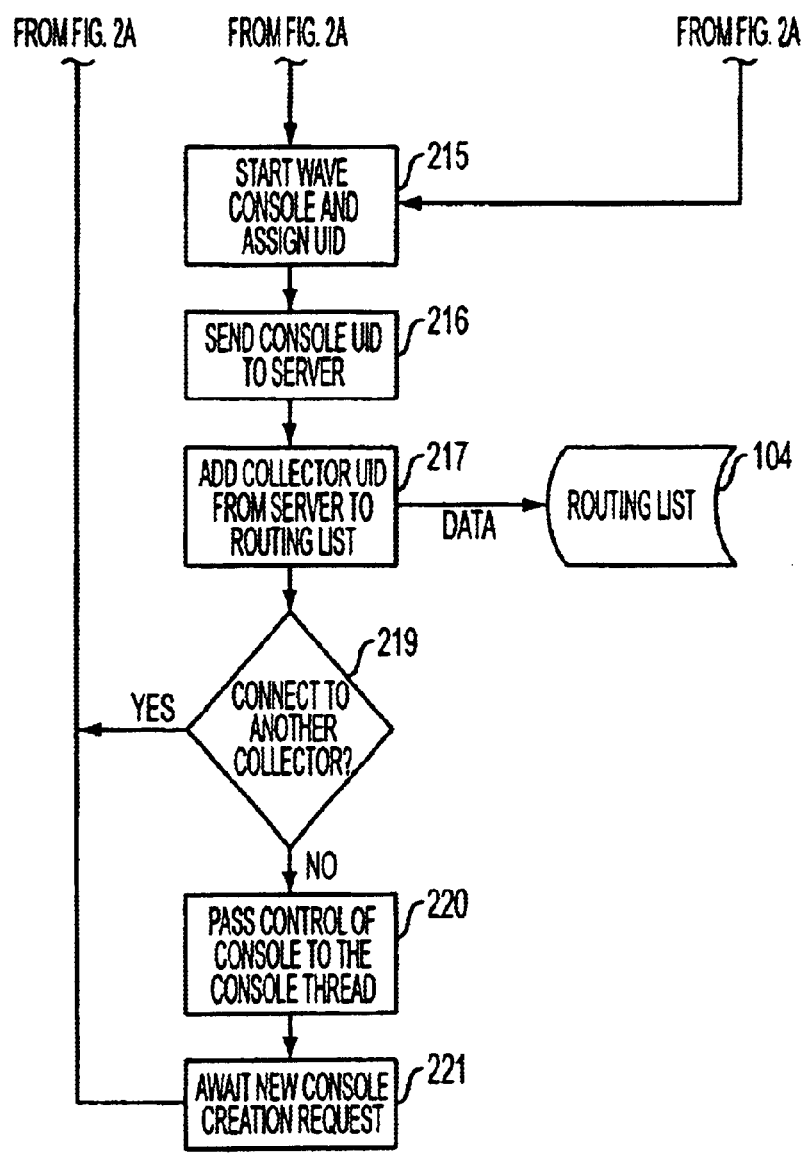

FIGS. 2A and 2B illustrate the normal execution of a WAVE client 108 in the preferred embodiment. In this particular instance, the WAVE client software 108 is executed by an application that has been written to monitor WAVE enabled applications. The application provides facilities such as output to the monitor, the ability to communicate over the network and feedback from input devices.

After the application has started and the WAVE client 201 has loaded its required classes, it checks the number and type of available Consoles 111. The Consoles 111 are usually unique to each Collector 105 but can be generic (see above). After determining which WAVE Consoles 111 are useable, a list is created and stored in memory for future reference 202.

Most WAVE clients 108 use a number of Consoles 111 to display different types of data to the observer. To allow the main client thread to create numerous Consoles 111, a new thread is spawned 203 to handle the client's network communications. The new Console thread handles the Consoles' network communications and the observer commands and requests. For more detail on this thread's operation, see Client Console operation below.

The client 108 completes its initialization 201–203 and commences creating connections 204 between Consoles 111 and appropriate Collectors 105. The client 108 connects to a server 102 that is specified in a configuration file or by the observer. The client 108 could, for instance, display all the WAVE servers 102 on a Local Area Network (LAN) and allow the observer to select the appropriate server 102 from that list.

Depending on the configuration of each WAVE server 102, the client 108 may be required to authenticate itself 205. In most development environments this is not required. If WAVE was used publicly, this authentication 205 would provide added security to the connection. The WAVE client 108 uses a predefined authentication procedure to securely open a connection 206 with the WAVE server 102. The authentication procedure 206 can include measures such as prompting the observer for a login name and password, restricting access to certain network addresses or even establishing an encrypted connection. After completing the authentication procedure 206, the client 108 waits for the server's 102 response 207. If successful, the client 108 continues the connection procedure. If not, the client 108 awaits a shutdown message 213 and terminates the connection 214. If the server 102 accepts the connection from the client 108, the client 108 awaits the server's Collector list 208. The Collector list 208 contains all the Collectors 105 that are available to the client 108. Note that this may not be all the Collectors 105 on the server 102. If security levels are implemented by the server 102, Collectors 105 can be restricted to certain access levels. For instance, if a client 108 connects with Level 1 access, they may not be able to access the Collector that provides user information. If the client connects on Level 4 access however, all Collectors may be available. Using this leveled security, WAVE allows increased user privacy protection and security customization.

The client 108 now requests to connect the Console 111 to a Collector 105 on the server 102 (step 209) and checks whether the Collector 105 is available 210. If the Collector 105 is not in the server's listing, the client 108 awaits the server's request for the Collector. Depending on the server's 102 response (security levels may forbid downloading the Collector from the client), the client 108 can upload the appropriate code to the server 102. This WAVE feature allows observers to dynamically monitor new sections of application code without user intervention. If the server 102 requests the Collector 105, the client 108 checks the availability and uploads the Collector code 212. If the code is not available or the server 102 rejects the upload offer, the client 108 commences terminating that connection. The client 108 waits for the shutdown message from the server 213 and shuts that connection to the server 214. Having established a valid connection with the specified Collector 105 through the WAVE server 102, the client 108 initializes the Console 111 (step 215). Each Console 111 is assigned a unique identifier (UID) 215. The client 108 sends the Console's UID, a long with the its own identification, to the server 216. This allows the WAVE server 102 to uniquely identify each Console 111 when there are numerous connections. Within the client 108, the Console UID allows the Console thread to channel incoming data to the correct Console 111.

Upon receiving the Console UID, the server 102 returns the applicable Collector GUID to the client. Similar to the WAVE server 102, the client 108 uses the Collector's GUID and the server's identification to route data between the Console 111 and Collector 105. The Collector GUID is then stored in the routing list 218 to allow the client to identify incoming data and route outgoing data 217.

Most Consoles 111 monitor one system in an application. They therefore connect to and display data from one Collector 105. WAVE does however, allow each Console 111 to handle connections to multiple Collectors 105 (step 219). It may be useful to, for instance, calculate the average frame rate across all systems on a LAN. One Console 111 could connect to a number of WAVE servers 102 and access the current frame rates. The average frame rate could then be displayed.

If no further Collectors 105 are required by the Console 111, the WAVE client 108 passes control of the Console 111 to the Console thread 220. This allows the main client thread to await a new request to create a Console 111 (step 221). Upon receiving a Console creation request, the client begins the process again 204 while the Console thread handles all the communications and user input to the previously created Consoles 111 (see FIG. 3).

Client Console Operation

Figure 3:
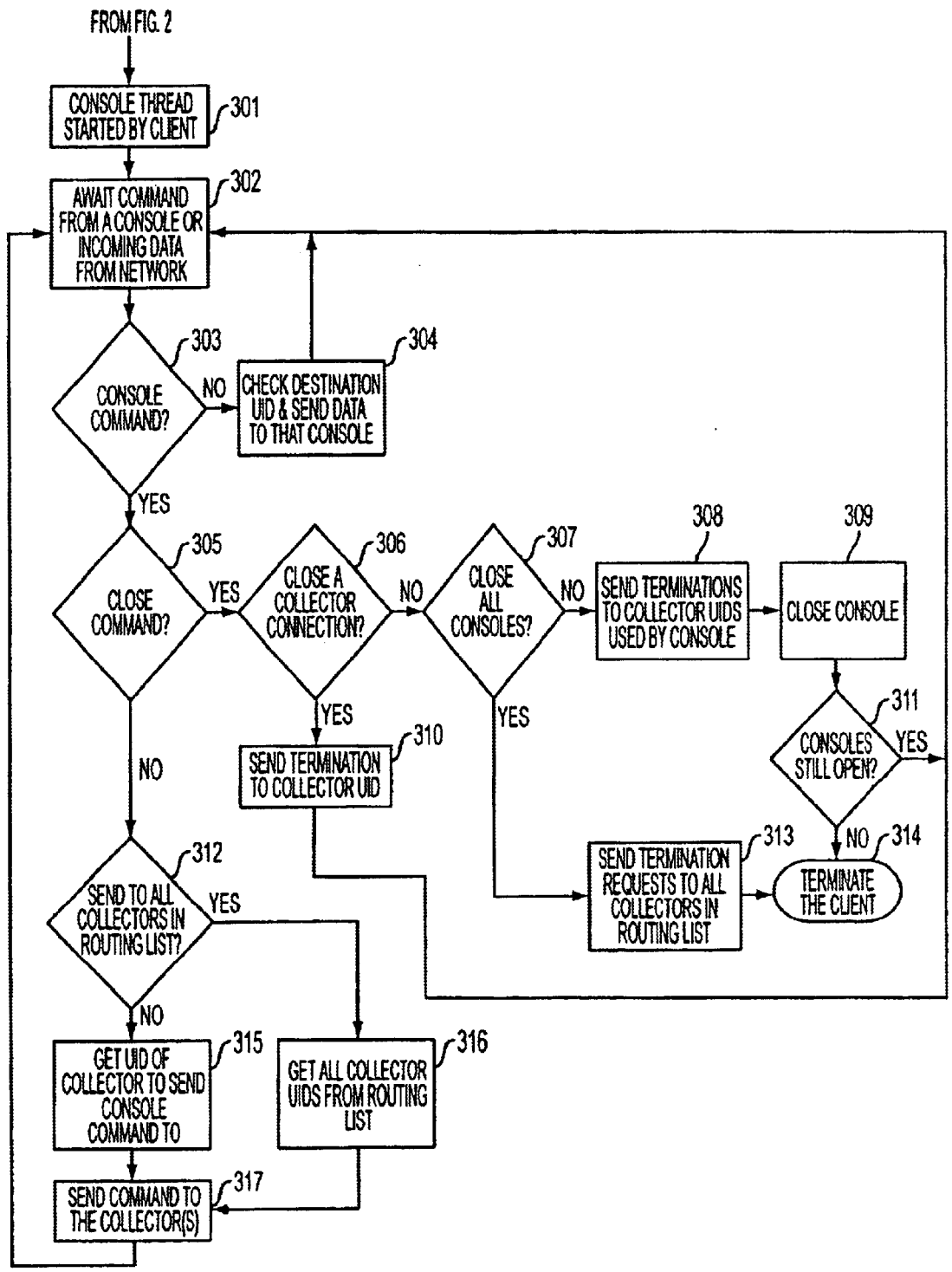
FIG. 3 is a flow chart representing the client console thread operation.

FIG. 3 illustrates the functional operation of the Console thread within the WAVE client 108. The thread is executed by the client 108 after its initialization 301. It takes charge of each Console 111 after the initial Collector 105 connections are made.

The Console thread acts as a distributor of incoming Collector data and also sends observer commands and requests to the Collectors 105. As such, the thread waits for one of two events to occur 202.

When an event is detected, the thread must determine where the event came from and what must be done. The thread first checks if the observer entered a command in the Console 111 via a mouse click, keyboard command or similar 303. If the user did not cause the event, data must have arrived from a Collector 105. The thread examines the Collector data and checks the data integrity. The UID of the destination Console 111 is extracted and the data is sent to the Console 111 using an appropriate method 304 The thread then returns to await another event, or if one has already occurred, to handle that event 302.

If the thread finds that the observer issued a command to the Console 111, the nature of the command is determined. The thread checks if the observer issued a close command 305. As each Console 111 can handle multiple Collector 105 connections, and each client 108 can handle multiple Consoles 111, there are several close command possibilities.

The user may choose to close the connection to a Collector 105 from within a Console 111. If the thread determines this is the case 306, the thread obtains, and removes, the Collector GUID from the routing list 110. A termination notification is sent to the Collector 105, via the server 102, which includes the Console's UID and client identification. The WAVE server 102 then removes the Console 111 from the server routing list 104 (see Server Collector thread operation below). The client 108 then awaits another event 302.

The second possible close request may be to close all the Consoles 111 currently running on the client 108. This occurs when the observer chooses to exit the WAVE client 108. If the user selects to close all the Consoles 111, the thread obtains, and removes, all the Collector GUIDs from the routing list 110. Termination notifications are sent to the applicable Collectors 105 (step 313). After sending the notifications, the client 108 terminates and the program ceases operation 314.

The final close request an observer can issue, is to close a Console 111. The thread looks in the routing list for all the Collector GUIDs that the Console 111 uses 308. The UIDs are removed from the routing list 110 and termination requests are sent to all applicable Collectors 105 (step 308). The Console 111 is then closed 309. If, after closing the requested Console 111, no other Consoles 111 are open 311, the client terminates 314. However, if there are Consoles 111 still open, the thread awaits the next event 302.

When the thread determines the observer input was not a close request, it concludes the observer wants to issue a command to a Collector 105. The command can be issued to a specific Collector 105, a group of Collectors (105) or all connected Collectors 105 (step 312).

If the observer chooses to send a command to a specific Collector 312, the thread obtains the Collector's GUID from the routing list 110. The observer's command is then sent to the Collector 105 (step 315). WAVE, in effect, allows the observer to issue commands to an executing application. This ability allows observers to finely tune internal application attributes for optimal performance and stability. They can, for instance, change an application's settings and monitor the effects. If the application is more stable or efficient those changes can be adopted in future revisions of the application. Thus, WAVE allows increased application optimization and quality assurance.

Continuing the above example, if the observer finds a setting that enhances the application, WAVE can propagate that change to all systems currently being monitored. When the observer chooses to issue a command to a group of Collectors 105, the thread must obtain all the appropriate UIDs from the routing list 110 (step 316). The group of Collectors 105 is usually restricted to a certain type (for instance, the artificial intelligence Collector on all systems) but can be all Collectors currently in the routing list 110 if the change is adequately generic.

After obtaining all the appropriate GUIDs for the command, the thread sends the command to each Collector 317. The thread then returns to its wait state 302.

Server Operation

Figure 4A:
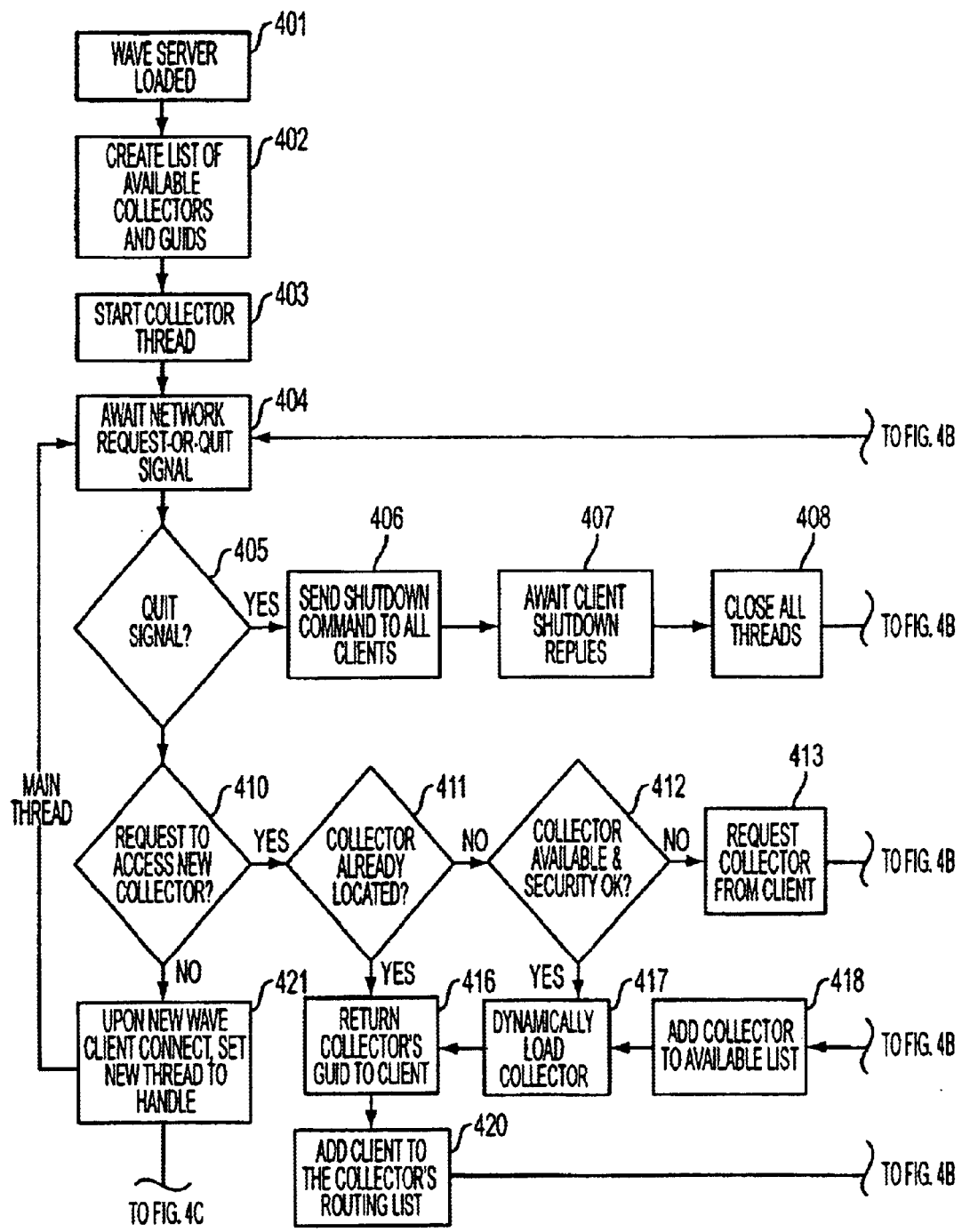
FIGS. 4A through 4C are flow charts of the steps of the server-side operation.
Figure 4B:
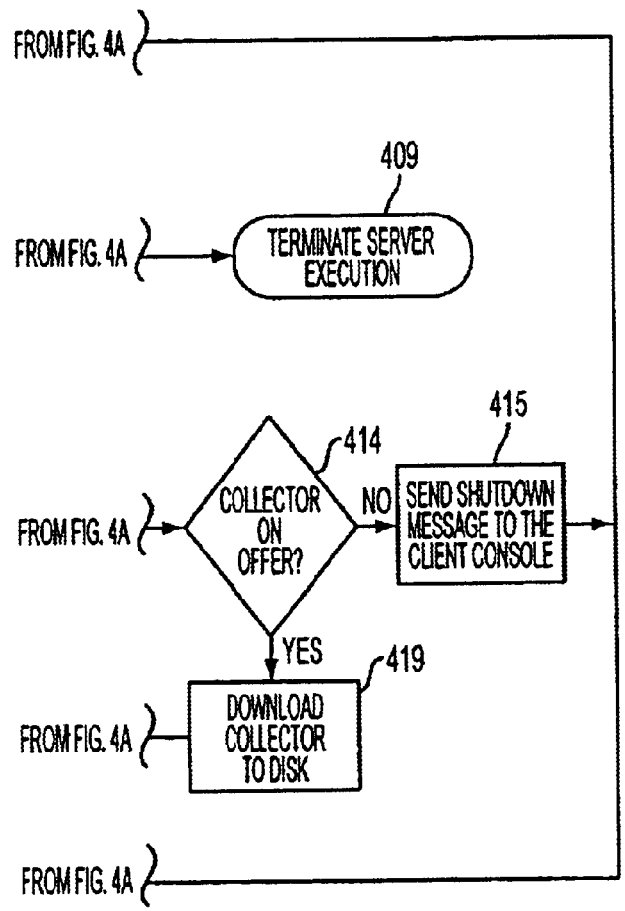
Figure 4C:
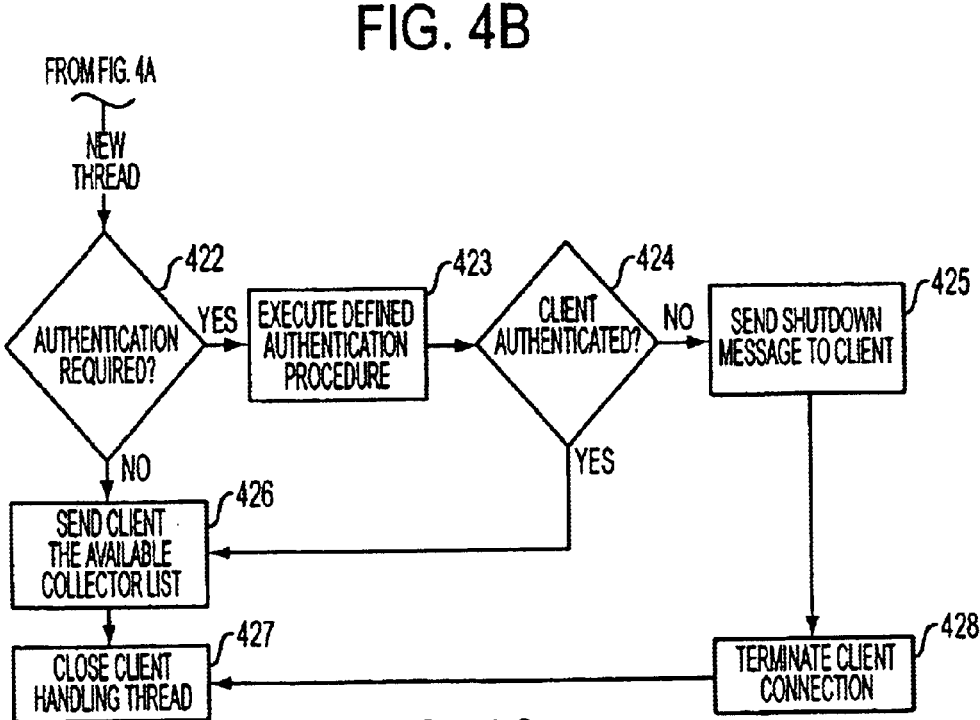

FIGS. 4A through 4C illustrate the standard operation of a WAVE server 102. The server 102 handles incoming connection requests from clients 108 and maintains a list of available Collectors 105. The WAVE server 102, in the preferred embodiment as described by FIGS. 4A–4C, is loaded by an application during its initialization 401. As has been previously mentioned, the WAVE server can be implemented by any system that has the appropriate WAVE interfaces.

The server's 102 first task is to determine the available Collectors 105 and create the Collector list 202. Each Collector is stored on the server system's storage device. Before the Collector 105 is added to the list, the server 102 verifies the integrity of the Collector 105. The server 102 also adds security information to each Collector's list entry. The security information can include, for instance, information on which security level is required to load a particular Collector 105. This information along with the Collector 105 availability is stored in the available Collector list and is used throughout the server's execution.

The WAVE server 102 acts as a type of daemon that must constantly accept new client connections. To manage the communications between the collectors 105 and clients 108, a second thread is required. The Collector thread is started to perform this task 403.

The server 102 now enters its wait state 404. This is a typical state for many server programs that wait for an event to occur. In this state the server uses very little memory and processor time. The server 102 appears, conceptually, to be dormant until an event occurs.

When an event occurs, the WAVE server 102 is, theoretically, awoken to handle the event. The server 102 first checks if the host application is issuing a quit signal 405. If a quit signal is received, the server 102 must close all its connections and terminate. This. involves several stages.

The server 102 first obtains the UID and client address of each Console 111 currently connected to a Collector 105. The server 102 sends a shutdown message to all the Consoles 111 so they shutdown 406. Once no client connections remain 407, the server 102 closes all the Collectors 105 that have been previously loaded, saving any permanent changes to disk 408. The Collector thread and any other outstanding threads are then terminated and the WAVE server 102 ceases execution 409.

If the server 102 resolves that no quit signal was received 405, the server 102 checks if a previously authenticated client 108 is requesting a Collector 105 (step 410). When a client 108 requests a Collector 105 the server 102 checks a number of possibilities. First, the server 102 examines the system memory to determine if the Collector 105 has already been loaded 411. This occurs when a number of clients 108 (or Consoles 111) request the same data from a Collector 105. For instance, if two observers are monitoring the 3D performance of one server 102, the same Collector 105 is used. When the second client requests the data, the Collector 105 will have already been loaded for the first client.

When the above scenario occurs, the Collector 105 has already been loaded and assigned a globally unique identifier (GUID) identifying the Collector 105. In such a case, the server simply returns the Collector's GUID to the client 416. The client 108 is then added to the routing list 104 for that Collector 105 (step 420) and the server 102 returns to the wait state 404.

The first time a Collector 105 is requested, the Collector 105 must be instantiated from a storage device 411. The server 102 checks if the Collector 105 is listed as available in the Collector list 412. The server 102 verifies the client's security level against the requirement in the Collector list 412. If the client 108 has sufficient security and the Collector 105 is available, the collector 105 is dynamically loaded into system memory 417.

If the server 102 does not have the Collector 105 the client 108 is specifying, WAVE allows the appropriate code to be uploaded from this client 108 to the server 102. If the client 108 has sufficient security, as previously determined, the server 102 requests the Collector 105 from the client 413. The server 102 downloads the Collector 105 to the system 419 if the client 108 is offering the collector 414. The Collector 105 is then added to the available Collector list 418, dynamically loaded into the system's memory 417 and assigned a GUID. The GUID is transmitted to the client 108 for further communications 416 and the client's identification is added 420 to the Collector's routing list 104.

When the Collector 105 is not available, or the client 108 has insufficient security to connect to the Collector, the server 102 sends the client a connection shutdown message 415. This also occurs when the server 102 attempts to download the Collector 105 but the client 108 rejects the transfer 414. After issuing the connection shutdown message, the server 102 returns to await a new request 404.

The final request a WAVE server 102 can receive is where a client 108 connects to the server 102 for the first time 421. To allow multiple simultaneous client connections, the server 102 spawns a new thread 421 and returns to the wait state 404. The new thread then continues processing the new client connection 421. WAVE servers 102 optionally require authentication to be performed when a new client 108 connects. If such authentication is required 422, the thread executes a predefined authentication procedure 423. This procedure is a known security protocol between the client 108 and server 102. It may also prompt the application user on the server side, to check if they want the connection. This, in addition to the other security measures WAVE can implement, allows for complete user security.

Depending on the security procedure, the client 108 may be accepted and authenticated by the user, or authenticated by the WAVE server 102. If the client 108 fails the authentication, the thread sends a connection shutdown message to the client 425 which closes the Console 111 requesting the connection. The connection with the client 108 is then terminated 428 and the thread is also closed 427.

When the client 108 does not require authentication 422, or is authenticated 424, it gains access to the WAVE server 102. The thread sends a list of available Collectors 105 to the client 426. The list is a subset of the server's Collector list using the client's security level to limit the available Collectors. When a server 102 does not require authentication, or when a client 108 has full access, all the Collectors 105 on the server are available to the client. After sending the list of the appropriate Collectors, the thread closes 427.

Server Collector Thread Operation

Figure 5A:
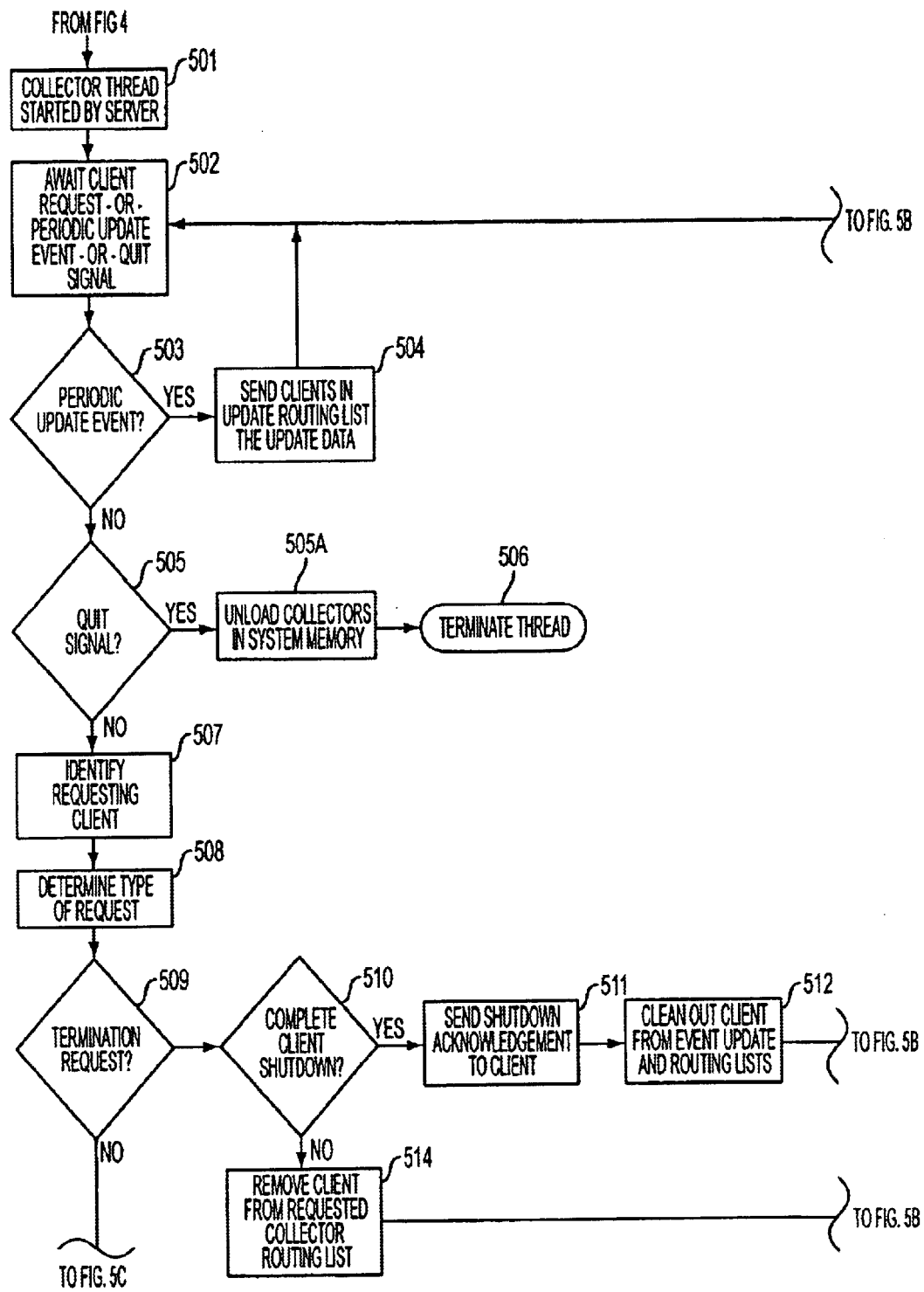
FIGS. 5A through 5C are flow charts representing the server collector thread operation.
Figure 5B:
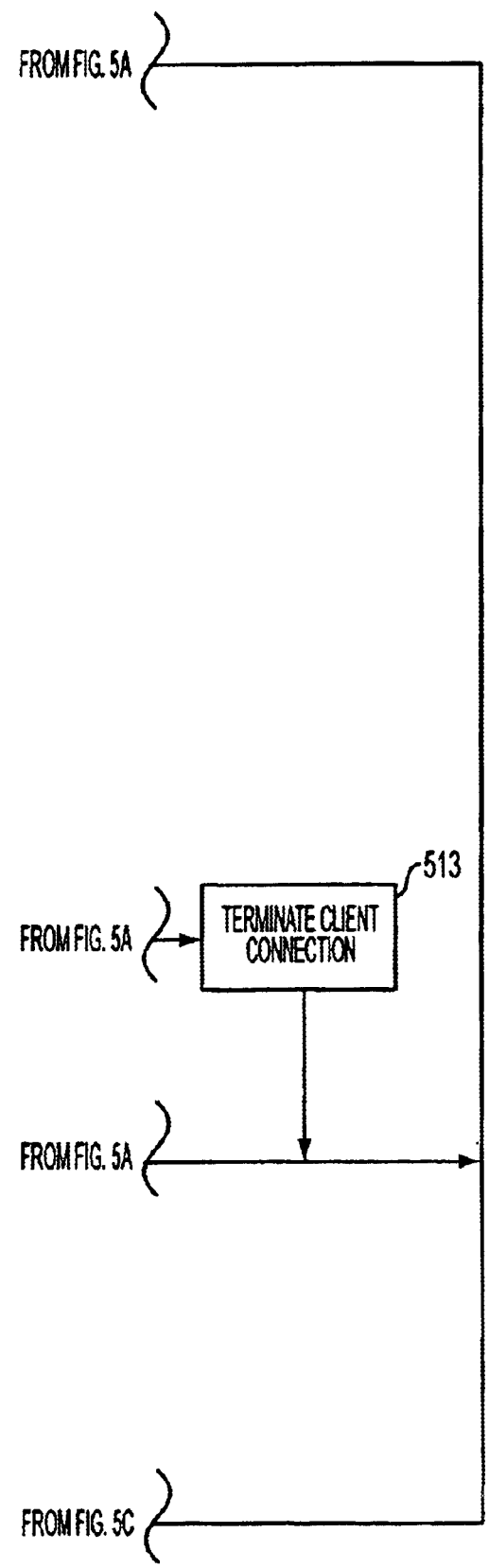
Figure 5C:
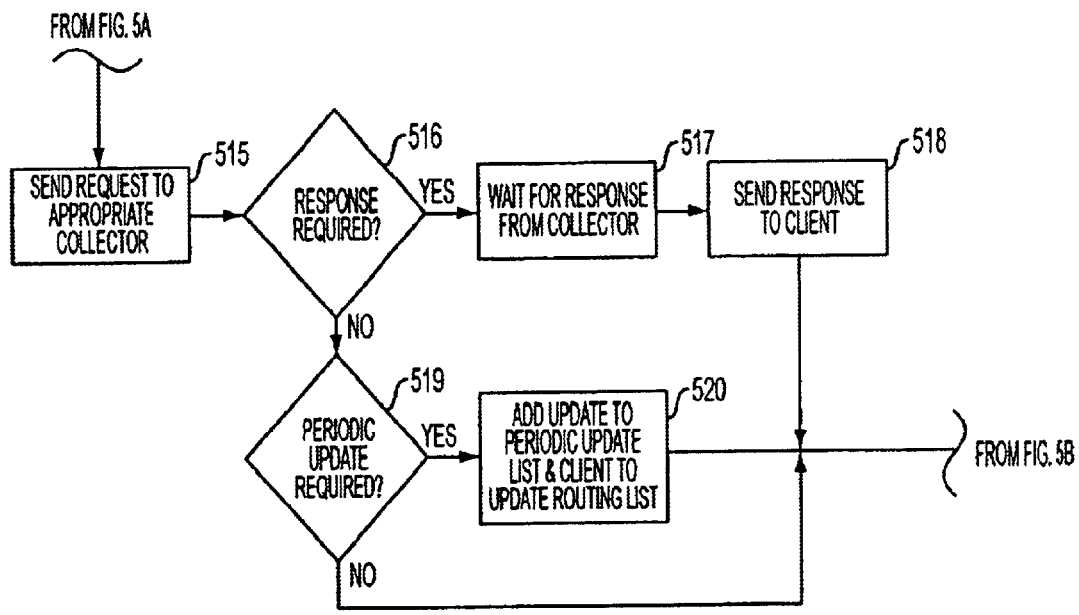

FIGS. 5A–5C illustrate the standard operation of the WAVE server Collector thread. The thread is executed by the WAVE server 102 (step 501) to handle communications between Collectors 105 and WAVE clients 108. After initializing, the WAVE server Collector thread enters a typical server wait state that is widely used in the art 502. In this state, the thread waits for a client 108 data request, a periodic update or a quit signal from the WAVE server 102.

Upon an event occurring, the thread first checks if a periodic update has occurred 503. These events allow WAVE clients 108 to receive timely updates for continued system monitoring. For instance, a WAVE client 108 can request to have the system's frame rate sent to it every 0.25 seconds. This would become a periodic update that would trigger every quarter of a second. If a periodic update has occurred, the thread obtains the appropriate client information from the routing list (see above) and sends the client 108 the updated data 504.

After determining that no periodic update has occurred, the thread checks if a quit signal was sent 505. A quit signal arrives when the WAVE server 102 is exiting. When the WAVE server 102 notifies the WAVE clients 108 of the shutdown, the collector thread unloads the Collectors 105 from memory 505A and terminates 506.

If the event is not a periodic update or a quit signal, a request from a client 108 has been received. To fulfill the data request, the data is analyzed to determine the type of demand. First, the requesting client 108 is identified based on information extracted from the received data 507. The type of request is also determined 509. In the preferred embodiment, and as illustrated in FIG. 5, there are two types of requests. This can be expanded to accommodate new features as appropriate. The first possible type of request from a client 108 is to terminate its connection with one or a number of Collectors 509. If the client 108 is shutting down completely 510, it sends the WAVE server 102 (and thus the thread) a client shutdown notification. If a client shutdown notification is received 510, the thread acknowledges the message by sending an acknowledgement to the client 511. The thread then removes the client 108 from the routing list 104 and removes any client requested periodic update events 512. Finally the client's connection is terminated 513. This final stage also removes any client security authentication information that the server 102 held. After the client information has been removed from the system, the thread returns to its wait state 502.

If the client 108 is not shutting down 510 but has sent a termination request 509, it is requesting to close a connection with one Collector 105. Upon receiving such a request, the thread removes the client 108 from the Collector's update event list 514. The thread then returns to the wait state 502.

When the request is not a termination request, it is passed to the appropriate Collector 105 (step 515). To determine the correct Collector 105, the GUID of the Collector is extracted from the data. If the command requires a response 516, the thread waits for that response 517 and sends the response to the client 518. The thread then returns to its wait state 502. Certain client requests do not require a response 516. For instance, if a client instructs a Collector 105 to change a value, a response is not needed if the change will appear after the next periodic update. The change is indirectly confirmed when the periodic update is sent. By not requiring an acknowledgement after each request, WAVE clients 108 can limit the amount of network traffic and therefore conserve bandwidth.

Another type of request that does not require a response 516 is one requesting a periodic update. If the client 108 requests a periodic update 519, the thread adds the new event to the periodic update list and puts the client in the routing list 520. The thread then loops back to its wait state 502.

Technology Requirements

Software Requirements

WAVE Interface

To allow WAVE Collectors 105 to interface with other systems, the preferred embodiment of WAVE uses a Component Object Module (COM) like interfaces although other methods known to the those in the art could also be used to obtain a similar result. COM is a programming paradigm used extensively in modern computer systems and is well known in the art.

As the WAVE invention uses COM like interfaces, it is extensible to other systems with little knowledge of the new systems' internal workings. If a developer implements the appropriate WAVE interfaces in their systems, the WAVE server 102 is able to interact with and provide data from their application's systems. WAVE compatibility is easily implemented due to WAVE's use of COM like interfaces.

WAVE Server

The WAVE server 102 is implemented as a component of a WAVE compatible system. It is the responsibility of the WAVE server 102 to:

1. Identify and authenticate WAVE clients 108 via network connections;
2. Dynamically load and unload Collectors 105 as required;
3. Download, via a network connection with another system, new Collectors 105 as required;
4. Provide a channel for the flow of data and commands between the WAVE client 108 and WAVE Collectors 105;
5. Through its Collectors 105, unobtrusively and efficiently gather and adjust the internal settings of WAVE compatible applications and systems; and
6. Through its Collectors 105, save application usage data to local storage for upload and analysis at a later date.

WAVE Client

The WAVE client 108, as described in the preferred embodiment, is implemented as a component of a host application. That is, the host application is used to display the data that the WAVE client 108 obtains from the WAVE server 102. Due to the nature of the invention, the client application is quite flexible as its main task is to simply receive and display WAVE data in a meaningful way and provide a facility to issue and forward commands to the WAVE server 102 and provide input from the user.

Regardless of the implementation used, the WAVE client 108 must be able to:

1. Connect to, and authenticate itself with, WAVE servers 102;
2. Upload a requested Collector when available on the local system;
3. Open a number of Consoles 111; and
4. Transfer data requests and commands to and from WAVE servers 102 and Consoles 111.

Technical Functionality

To further explain the functionality of the WAVE client 108 and server 102, it is helpful to consider a short example. The following example shows two possible uses of WAVE in an application development environment.

Assume that an application simulating a 3D city was written that incorporated the WAVE invention. To correctly simulate a city, a number of complex systems are required. For this example we will focus on the artificial intelligence (AI) and 3D graphics sub-systems.

The AI system in the application provides a number of features (such as priority action lists, schedules and finite state machines) that can be used to simulate humans living in the city. Due to the complex nature of humans, the developers may choose use a third parties' AI libraries as a base and extend the AI system by writing additional AI code specifically tailored to their simulator.

To realistically display the city's buildings and surrounding environment, the developers also decide to use a complete 3D system provided by a third party.

The developers have, therefore, used a mixture of third party systems and their own customized code. The two third party systems (the AI and the 3D system) are compatible with WAVE. WAVE has the appropriate Collectors to gather information from both the AI and 3D systems. To analyze the developer's customized AI system, a new Collector is required. Once the developer writes the Collector, the WAVE server can provide data on the developer's system execution in addition to the AI and 3D systems.

The entire AI system and 3D system can now be monitored using WAVE. The WAVE server can gather the internal settings of the 3D and AI systems and make appropriate changes to each of them.

As the simulator is running the WAVE server, a WAVE client can monitor the simulation while it is executing. Once connected, the client can use appropriate Consoles to display the data obtained by the server's Collectors. From the 3D system, the Console displays the number of textures, meshes and animations currently in memory. The amount of memory used by the 3D system is also displayed. The observer decides to increases the 3D system's memory. Using an appropriate button or slide-bar, the observer changes the amount of memory allocated to the 3D system. With a simple mouse click, the command is sent through the WAVE client to the WAVE server and onto the 3D system Collector. The Collector then makes the appropriate change to the 3D system using the 3D system's WAVE interface. The observer has just made a real-time modification to an executing system. In addition, the observer can see the result of the change in real-time.

WAVE would also greatly assist the quality assurance of the AI humans (the units) in the city. As AI is exceptionally complex, it is difficult to pinpoint faults in AI algorithms. Using WAVE, an AI programmer can greatly improve their understanding of a fault in a small period of time. When a unit is acting erratically, the AI programmer can load the WAVE AI Console and request the AI system's data for the problematic unit. The data could include what state the unit is in, the unit's current goal and other pertinent AI information. With this information, the programmer can better understand what the AI system is attempting to accomplish and therefore find the algorithmic fault in a shorter period of time.

As this example demonstrates, WAVE offers developers the ability to monitor and modify their programs with relative ease. By giving an insight into the internal attributes of a program, WAVE greatly assists fault tracking and program optimization. When used in this manner, WAVE allows for higher quality products with lower development cycles.

The present invention has been described above in the context of remotely monitoring a computer program across a network. However, the present invention is of general applicability and is not limited to this application. While the present invention has been particularly shown and described with reference to representative embodiments, it will be understood by those skilled in the art that various changes in form and details may be made without departing from the spirit and scope of the invention.

What is claimed is:

1. A computer-implemented method for remotely monitoring and dynamically changing the operation of a computer game executing on a first computer while the computer game is executing, the computer game comprising computer code, the method comprising the steps of:

establishing a network connection between the first computer and a remote second computer;

monitoring, at the second computer, the operation of the computer game executing on the first computer while the computer game is executing;

issuing a command from the second computer to modify the computer code of the computer game while the computer game is executing;

modifying the computer code of the computer game at the first computer while the computer game is executing; and continuing to execute the computer game at the first computer in accordance with the modified computer code without ceasing execution of the computer game.

2. The method of claim 1 wherein the step of issuing a command to modify the computer code of the computer game while the computer game is executing comprises issuing a command to temporarily modify the computer code of the computer game while the computer game is executing.

3. The method of claim 1 wherein the step of issuing a command to modify the computer code of the computer game while the computer game is executing comprises issuing a command to permanently modify the computer code of the computer game while the computer game is executing.

4. The method of claim 1 further comprising the steps of:

operating the computer game prior to establishing the network connection between the first computer and the remote second computer;

storing, at the first computer, data relating to the operation of the computer game;

uploading the data to the second computer after the network connection is established; and analysing the data at the second computer to assist in determining how to modify the computer code of the computer game.

5. The method of claim 1 further comprising the steps of:

maintaining a server routing list at the first computer;

querying, at the first computer, the computer game to determine a list of available data;

sending the list of available data from the first computer to the second computer;

determining, at the second computer, a sub-set of the available data from the list of available data;

sending the sub-set of the available data from the second computer to the first computer;

collecting, at the first computer, data in accordance with the sub-set of the available data from the computer game; and providing the data collected in accordance with the sub-set of available data to the second computer.

6. The method of claim 1 wherein the step of issuing a command to modify the computer code of the computer game while the computer game is executing further comprises adjusting a resource value of the computer game.

7. The method of claim 1 wherein the step of issuing a command to modify the computer code of the computer game while the computer game is executing further comprises adjusting the amount of memory allocated to the computer game.

8. The method of claim 1 wherein the step of issuing a command to modify the computer code of the computer game while the computer game is executing further comprises adjusting the amount of memory allocated to pair of the computer game.

9. The method of claim 1 wherein the step of issuing a command to modify the computer code of the computer game while the computer game is executing further comprises changing an artificial intelligence module in the computer game.

10. The method of claim 1 further comprising the step of monitoring the operation of the computer game at the second computer after the modification has taken effect.

11. A computer-implemented method for remotely monitoring and dynamically changing the operation of an application program executing on a first computer while the application program is executing, the application program comprising computer code, the method comprising the steps of:

establishing a network connection between the first computer and a remote second computer;

monitoring, at the second computer, the operation of the application program executing on the first computer while the application program is executing;

issuing a command from the second computer to modify the computer code of the application program while the application program is executing;

modifying the computer code of the application program at the first computer while the application program is executing; and continuing to execute the application at the first computer in accordance with the modified computer code without having to shut down the application program.

12. The method of claim 11 wherein the step of issuing a command to modify the application program while executing comprises issuing a command to temporarily modify the computer code of the application while the application program is executing.

13. The method of claim 11 wherein the step of issuing a command to modify the computer code of the application program while the application program is executing comprises issuing a command to permanently modify the computer code of the application program while the application program is executing.

14. The method of claim 11 further comprising the steps of:

operating the application program prior to establishing the network connection between the first computer and the remote second computer;

storing, at the first computer, data relating to the operation of the application program;

uploading the data to the second computer after the network connection is established; and analysing the data at the second computer to assist in determining how to modify the computer code of the application program.

15. The method of claim 11 further comprising the steps of:

maintaining a server routing list at the first computer;

querying the application program to determine a list of available data;

collecting a sub-set of the available data from the application program at the first computer; and providing the sub-set of available data to the second computer.

16. The method of claim 11 wherein the step of issuing a command to modify the computer code of the application program while the application program is executing further comprises adjusting the amount of memory allocated to part of the application program.

17. The method of claim 11 further comprising the step of monitoring the operation of the application program at the second computer after the modification has taken effect.

18. A computer-implemented system for remotely monitoring and dynamically changing the operation of an application program while the application program is executing, the application program comprising computer code, the system comprising:

a first computer executing the application program;

a second computer executing a monitoring program;

a network connection between the first computer and the second computer;

computer program means, located at the second computer, for monitoring the operation of the application program executing on the first computer while the application program is executing;

computer program means, located at the second computer, for issuing a command to modify the computer code of the application program while the application program is executing;

computer program means at the first computer for modifying the computer code of the application program while the application program is executing; and computer program means, at the first computer, for continuing to execute the application in accordance with the modified computer code.

19. The system of claim 18 further comprising:

a routing list, located at the first computer; and collector means, located at the first computer.

20. A computer-implemented system for remotely monitoring and dynamically changing the operation of an application program while the application program is executing, the application program comprising computer code, the system comprising:

a first computer executing the application program;

a second computer executing a monitoring program;

a network connection between the first computer and the second computer;

a plurality of collectors, located at the first computer, each collector querying the application program to determine available data and obtaining available data from the application program;

a server program, located at the first computer, for providing data to a remote program;

a routing list, located at the first computer, for providing routing information to an appropriate client;

a plurality of consoles, located at the second computer, to provide an interface to allow a remote user to specify commands to observe and change the operation of part of the application program; and a second routing list, located at the second computer, to route data provided by server program to a select one of the consoles.

21. A set of instructions residing in a storage medium, said set of instructions capable of being executed by a processor to implement a method for remotely monitoring and dynamically changing the operation of an application program executing on a first computer, the method comprising the steps of:

establishing a network connection between the first computer and a remote second computer;

monitoring from the second computer the operation of the application program executing on the first computer while the application program is executing;

issuing a command from the second computer to modify the computer code of the application program while the application program is executing;

modifying the computer code of the application program at the first computer without having to shut down the application program; and continuing to execute the application at the first computer in accordance with the modified computer code.

* * * * *